July 23, 1963

L. V. CHABALA

3,098,915

CIRCUIT INTERRUPTER

Filed Nov. 16, 1961

INVENTOR.
Leonard V. Chabala,
BY
Robert R. Lockwood
atty.

United States Patent Office 3,098,915
Patented July 23, 1963

3,098,915
CIRCUIT INTERRUPTER
Leonard V. Chabala, Maywood, Ill., assignor to S & C Electric Company, Chicago, Ill., a corporation of Delaware
Filed Nov. 16, 1961, Ser. No. 152,843
18 Claims. (Cl. 200—146)

This invention relates, generally, to circuit interrupters and it has particular relation to such devices for interrupting the flow of alternating current in high voltage electric power circuits. It constitutes an improvement over the circuit interrupter construction shown in application Serial No. 704,397 filed December 23, 1957, now Patent No. 3,030,481, April 17, 1962, and in application Serial No. 111,998 filed May 23, 1961.

Among the objects of this invention are: To provide an improved circuit interrupter so arranged and constructed that the electrostatic stress between its terminals is substantially uniformly distributed; to provide main and arcing contacts for operation along a single axis; to require only a single operating seal for a circuit interrupter of the gas filled type by providing a single operating member for moving the main and arcing contacts; to provide an improved circuit interrupter construction having coaxial main and arcing contacts that are opened and closed by a single operating rod with provision with the confines of the interrupter for sequentially moving the contacts to effect the final circuit opening by separation of the arcing contacts; to provide in a new and improved manner for directing a flow of arc extinguishing gas under pressure to the space in which the arc is drawn between the arcing contacts; to direct the flow of arc extinguishing gas to the arc space through a nozzle mounted on a disc that is slidable in a cylinder which forms the main movable contact of the circuit interrupter; to cause the arc extinguishing gas to flow by holding stationary a piston in the cylindrical main movable contact while it is moved toward open position; and to prevent the creation of a vacuum between the disc and piston when the main cylindrical contact is moved toward closed position by providing a check valve on the piston which opens to place its opposite sides in communication with each other.

Other objects of this invention will, in part, be obvious and in part appear hereinafter.

Figure 1:
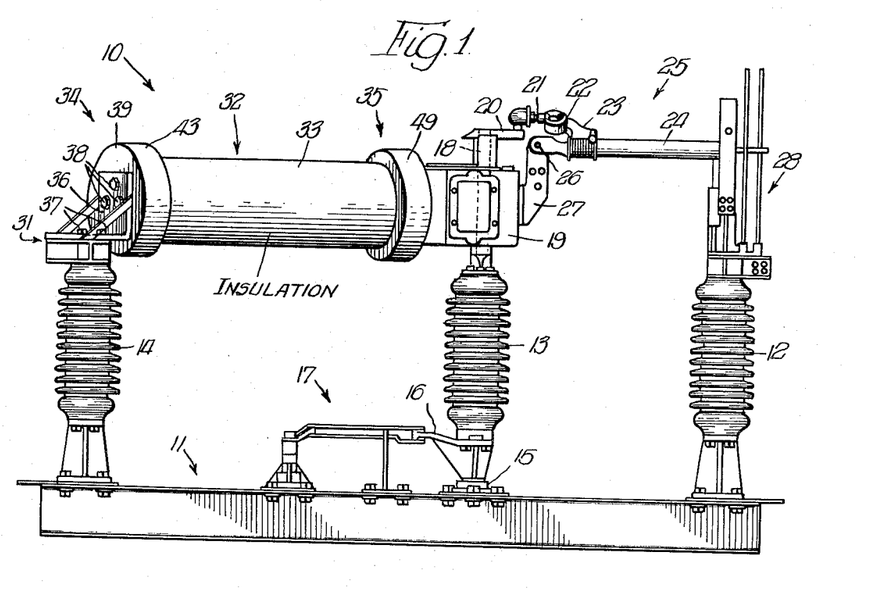
FIG. 1 is a view, in side elevation, of switch means embodying the present invention.

Referring now particularly to FIG. 1 of the drawings, it will be observed that the reference character 10 designates, generally, switch means in which the present invention is embodied. The switch means 10 includes a base, indicated generally at 11, that may be formed by a pair of rolled steel channels suitably secured together. Mounted on the base 11 are a first insulator 12, a second insulator 13, which is rotatable, and a third insulator 14. The second insulator 13 is rotatably mounted on a bearing 15 that is carried by the base 11 and it has an arm 16 extending therefrom for connection to a suitable operating linkage that is indicated, generally, at 17. It will be understood that, for three phase operation, three of the switch means 10 are mounted on a suitable switching structure in proper spaced relation, depending upon the voltage of the circuit, and that suitable operating means, common to the operating linkage 17, is provided for effecting the simultaneous rotation of the second insulator 13 of each switch means 10 for effecting simultaneous operation of the three switch means 10 for either opening or closing the circuit as may be required. Such an operating mechanism is illustrated and described in copending application Serial No. 704,397, above referred to.

Extending upwardly from and rotatable with the second insulator 13 is a shaft 18. The shaft 18 extends through and is rotatably mounted on a mechanism housing 19 the details of construction of which are set forth in application Serial No. 704,397, above referred to, together with the operating mechanism therein which is controlled by the shaft 18. For present purposes it is pointed out that the shaft 18 extends through the mechanism housing 19 and carries at its upper end a switch crank 20 which is rotatable therewith. The switch crank 20 is pivotally connected to a link 21 that is pivoted at 22 to an arm 23 which extends from a switch blade 24 that forms a part of a disconnecting switch that is indicated, generally, at 25. The switch blade 24 is pivoted at 26 on a bracket 27 which is carried by one wall of the mechanism housing 19. At its swinging end the switch blade 24 is arranged to move into and out of high pressure contact engagement with a line contact member, shown generally at 28, which is carried by the first insulator 12. It will be understood that, on rotation of the second insulator 13 by the operating linkage 17, a corresponding rotation of the switch crank 20 is effected for swinging the switch blade 24 out of or into high pressure contact engagement with the line contact member 28, depending upon the direction of rotation. The details of construction of the disconnecting switch 25 are conventional and may be as disclosed in U.S. Patent No. 2,818,474, issued December 31, 1957.

It is desirable that the switch blade 24 be opened only after the circuit has been opened previously by some other means. The reason for this is to prevent the drawing of an arc between the swinging end of the switch blade 24 and the line contact member 28 when the circuit is interrupted under load which might result in damage to these parts or the creation of a fault by arcing over to an adjacent phase or to ground. For this purpose there is mounted between the mechanism housing 19 and a line terminal 31, which is carried by the third insulator 14, a load current interrupter that is indicated, generally, at 32. As will appear hereinafter, separable contact means are provided in the load current interrupter 32 which are operated by the mechanism within the mechanism housing 19 under the control of the shaft 18 as described in detail in application Serial No. 704,397. Since the present invention is directed principally to the construction of the load current interrupter 32, the following description will pertain to its preferred arrangements, it being understood that the operating mechanism referred to is employed for controlling the opening and closing of the contacts of the load current interrupter 32.

The load current interrupter 32 is provided with an insulating housing 33 that preferably is a one piece hollow porcelain housing which may have a cylindrical exterior, as shown, or may have external corrugations to increase its flashover value between the ends. At the ends of the insulating housing 33 there are provided first and second circuit terminals that are indicated, generally, at 34 and 35.

Figure 2A:
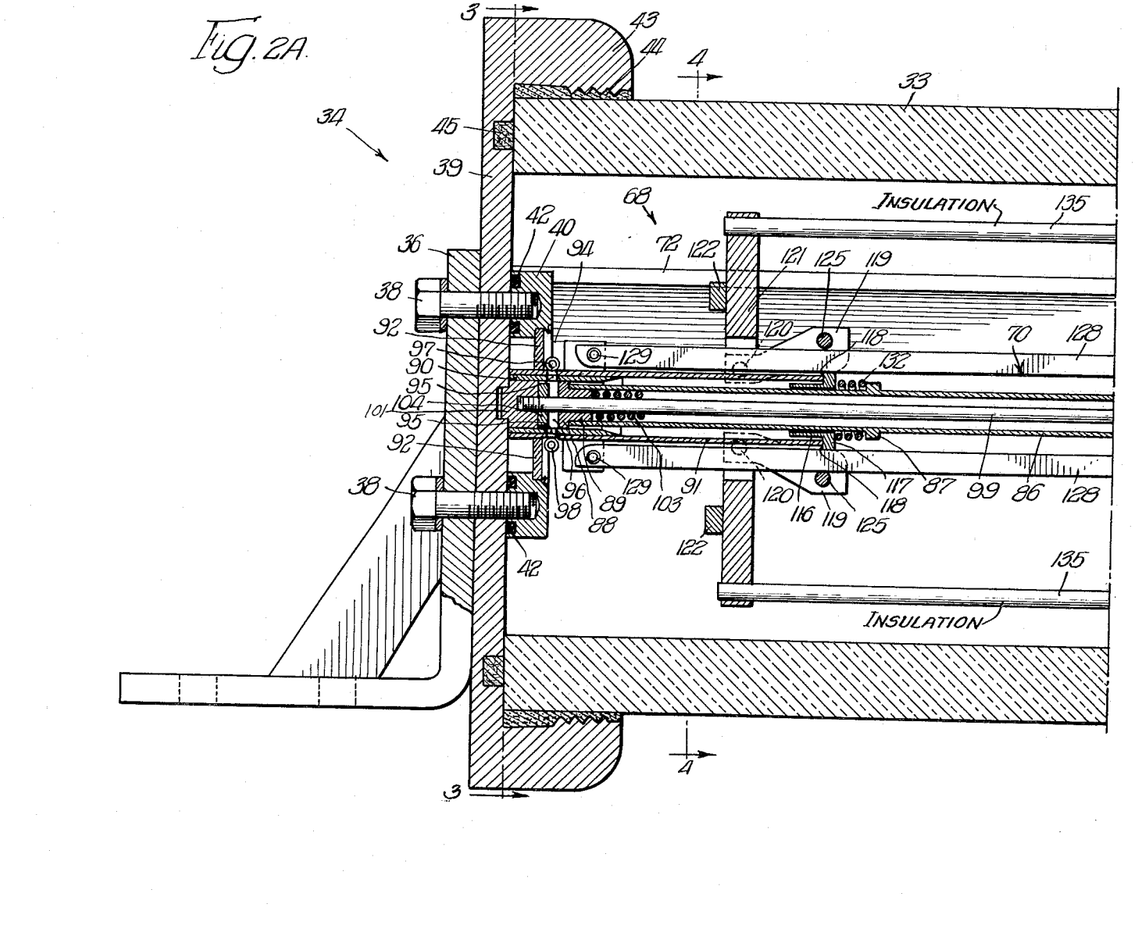
FIGS. 2A—2B—2C—2D placed in end to end relation in the order named show a vertical longitudinal sectional view through the load current interrupter embodying the present invention.
Figure 3:
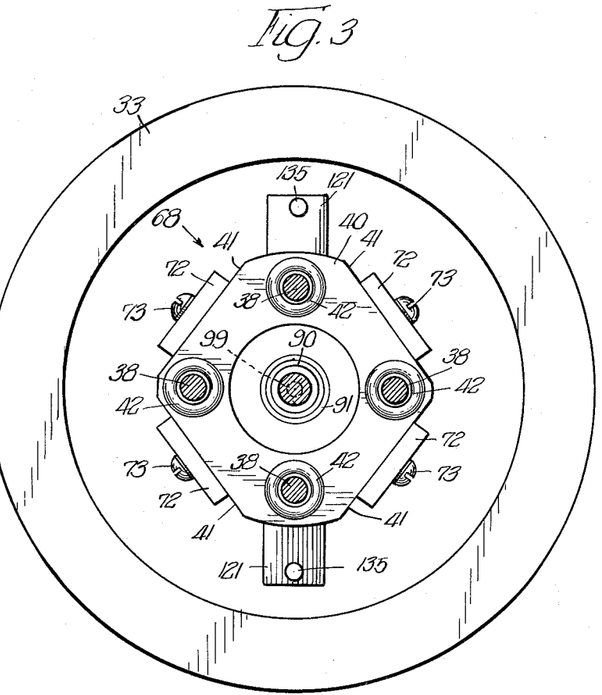
FIGS. 3 and 4 are vertical sectional views taken, generally, along the lines 3—3 and 4—4, respectively, of FIG. 2A.
Figure 4:
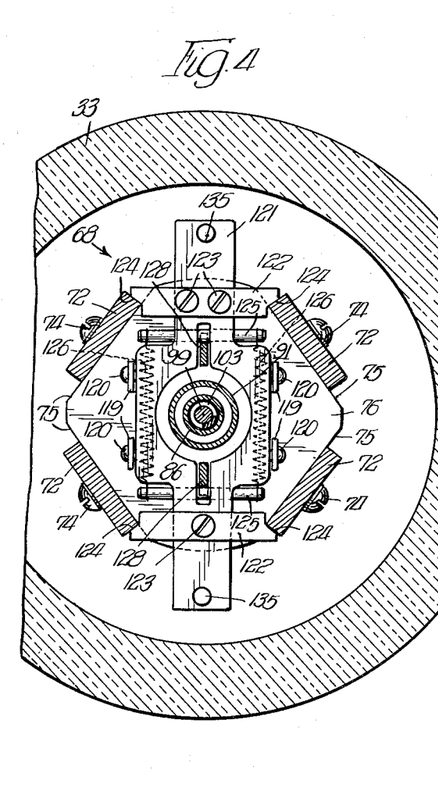

Referring now particularly to FIG. 2A, it will be observed that the first circuit terminal 34 includes a terminal bracket 36 that is secured by bolts 37, FIG. 1, to the line terminal 31 that is carried by the third insulator 14. Bolts 38 extend through a terminal plate 39 from an upstanding part of the terminal bracket 36 and are threaded into an inner terminal 40 which, as shown in FIG. 3, is provided with four flat sides 41 for a purpose that will be described hereinafter. O rings 42 provide a seal between the juxtaposed surfaces of the terminal plate 39 and inner terminal 40 and extend around the respective bolts 38 as shown. Formed integrally with the terminal plate 39 is an annular flange 43 which is telescoped over the adjacent end of the insulating housing 33 and is secured thereto by a suitable filling of cement 44. An annular gasket 45 provides an additional seal between the terminal plate 39 and the juxtaposed end surface of the insulating housing 33.

Figure 2B:
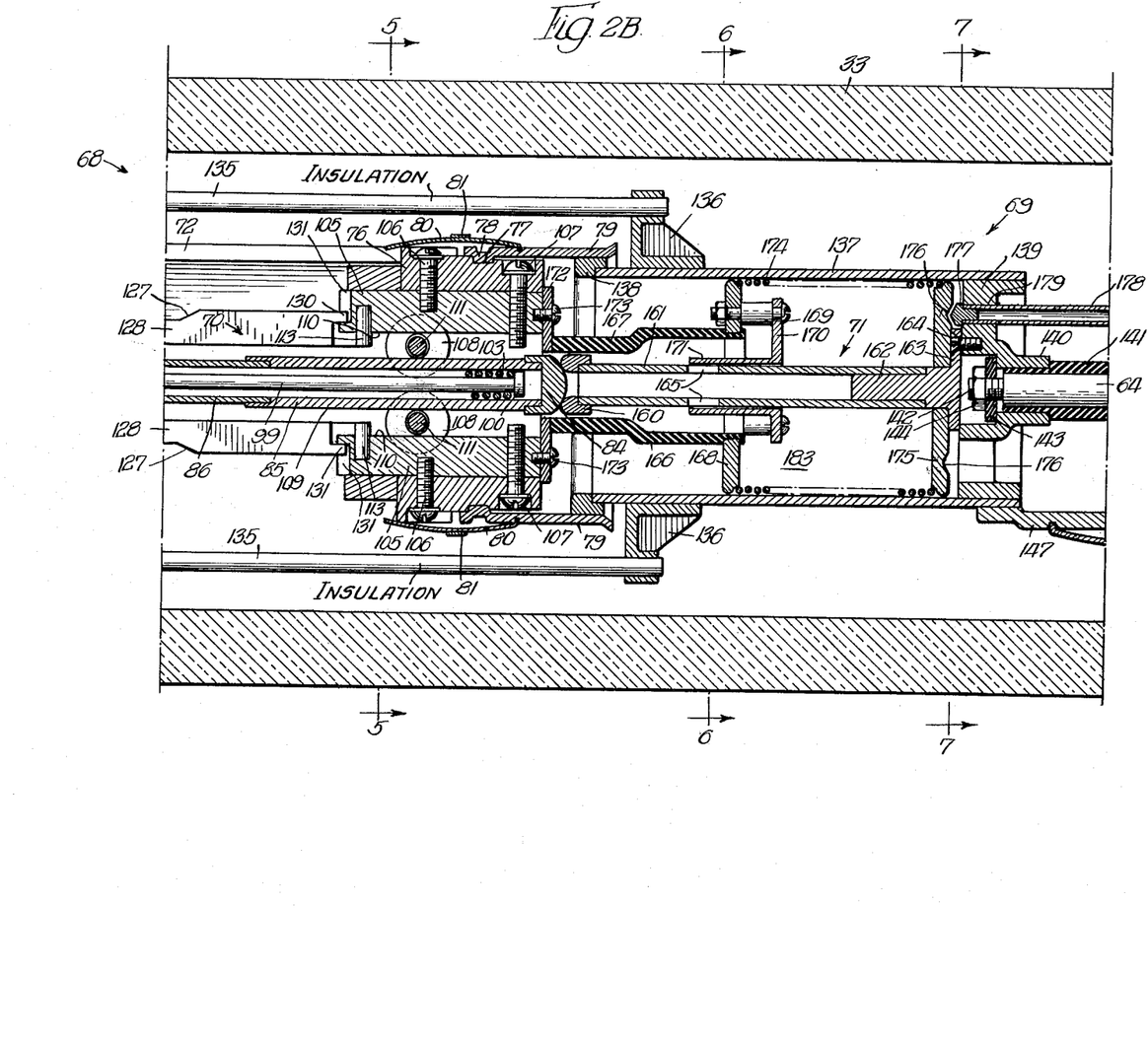
Figure 2C:
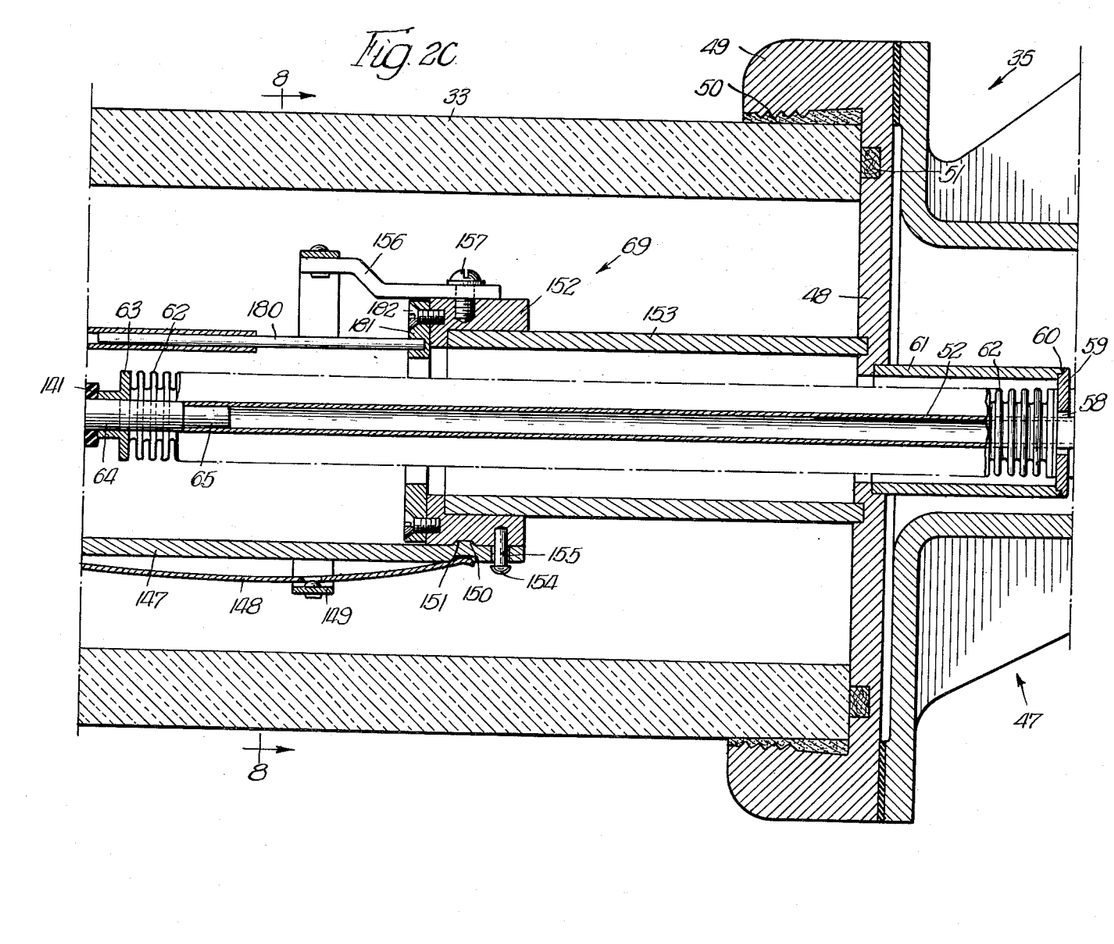

Referring now particularly to FIG. 2C of the drawings and to the opposite end of the load current interrupter 32, it will be observed that an adapter, shown generally at 47, constitutes a part of the second circuit terminal 35 and is mounted by suitable bolts (not shown) on the mechanism housing 19. Secured to the adapter 47 by bolts (not shown) is a terminal plate 48 which has an integral annular flange 39 that overlies the adjacent end of the insulating housing 33 and is secured thereto by a filling of cement 50. An annular gasket 51 is interposed between the juxtaposed surfaces of the terminal plate 48 and of the end of the insulating housing 33 to provide an additional seal therebetween to the end that the interior of the insulating housing 33 is gas tight.

Figure 2D:
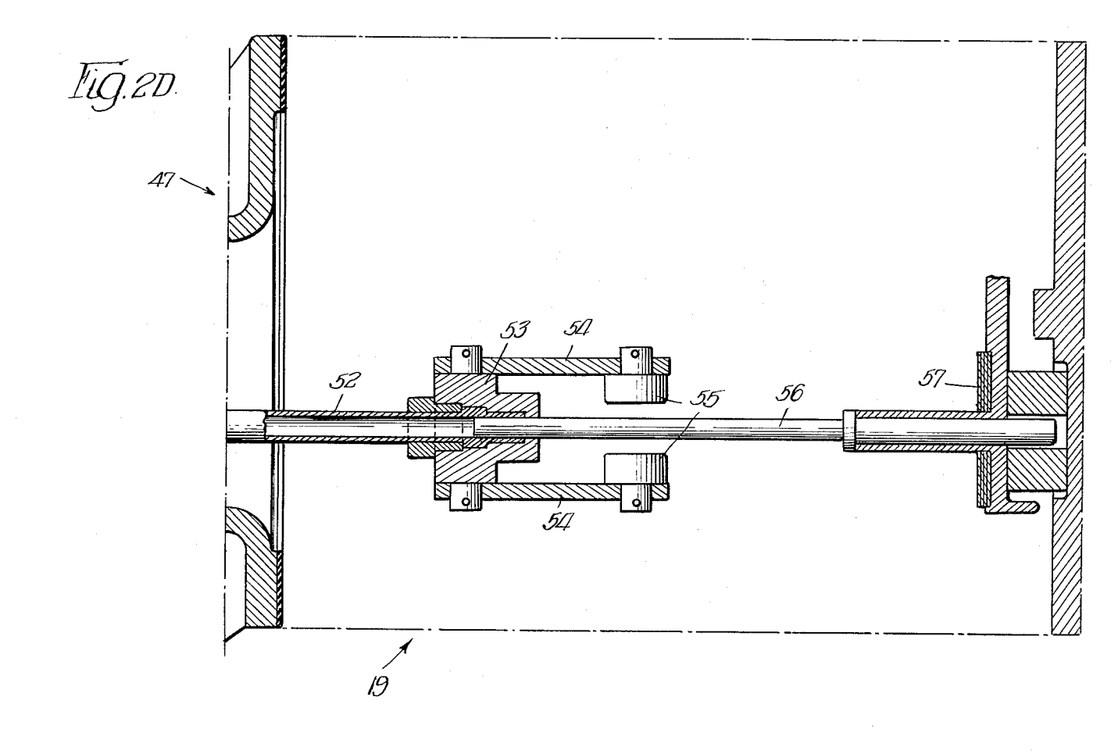

The operating means for the load current interrupter 32 includes an operating member 52 in the form of a metallic tube which, as shown in FIG. 2D, extends into and is fastened to a cross head 53 which is connected by links 54 to a main rod arm 55 of the spring driven operating mechanism within the mechanism housing 19 all as described in application Serial No. 704,397. Since only a single operating member 52 is employed for operating the load current interrupter 32, it is unnecessary to employ the additional auxiliary rod arm and operating mechanism therefor as disclosed in application Serial No. 704,397. The operating member 52 is guided on a guide rod 56 which extends from one wall of the mechanism housing 19. Layers of a suitable shock absorbing material 57 are mounted on this wall for cushioning the shock incident to the stopping of the main rod arm 55 and parts associated therewith in the open position of the load current interrupter 32.

In FIG. 2C it will be observed that the operating member 52 extends through an opening 58 in an annular flange 59 which is soldered at 60 to the outer end of a coupling tube 61 that interfits and is sealed to the terminal plate 48 which forms a part of the second circuit terminal 35. As described in application Serial No. 111,998, above referred to, a sealed connection between the operating member 52 and the terminal plate 48 can be provided by employing a plurality of bellows sections 62. At the right end one bellows section 62 is brazed or otherwise secured to the juxtaposed surface of the annular flange 59 while the bellows section 62 at the opposite end is brazed or otherwise secured to an end guide washer 63 that is suitably brazed to a coupling stud 64. It will be noted that the coupling stud 64 is telescoped within the adjacent end of the operating member 52, as indicated at 65, and is suitably secured thereto as by brazing. The bellows sections 62 permit the endwise movement of the operating member 52 through the terminal plate 48 while maintaining the gas tight integrity of the insulating housing 33 and the circuit terminals 34 and 35 secured thereto.

Extending inwardly from the first circuit terminal 34 is a stationary contact that is indicated, generally, at 68 and shown more clearly in FIGS. 2A and 2B of the drawings. Extending inwardly, FIGS. 2B and 2C, into the insulating housing 33 from the second circuit terminal 35 is a movable contact that is indicated, generally, at 69. Associated with the stationary contact 68 is a first arcing contact that is indicated, generally, at 70 while a second arcing contact, shown generally at 71, FIG. 2B, is associated with the movable contact 69. These contacts now will be described.

Figure 5:
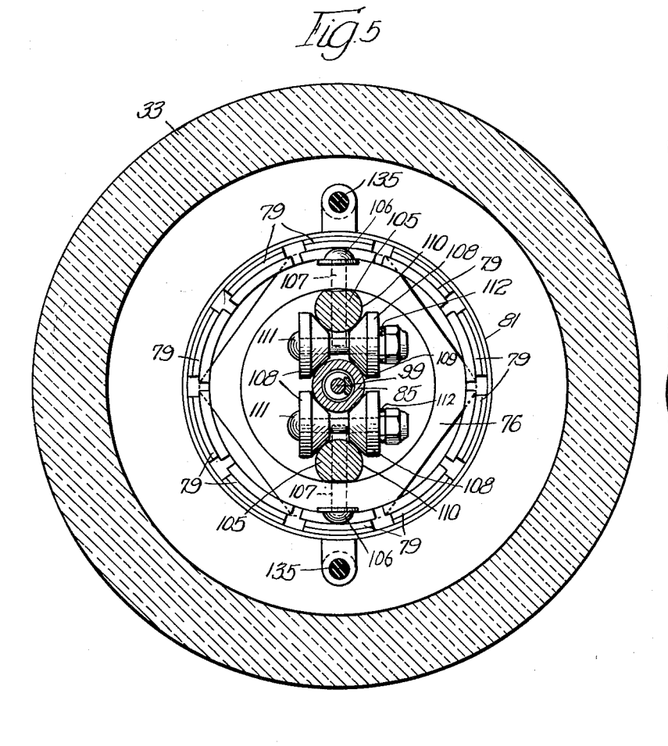
FIGS. 5, 6 and 7 are vertical sectional views taken, generally, along the lines 5—5, 6—6 and 7—7 of FIG. 2B.
Figure 6:
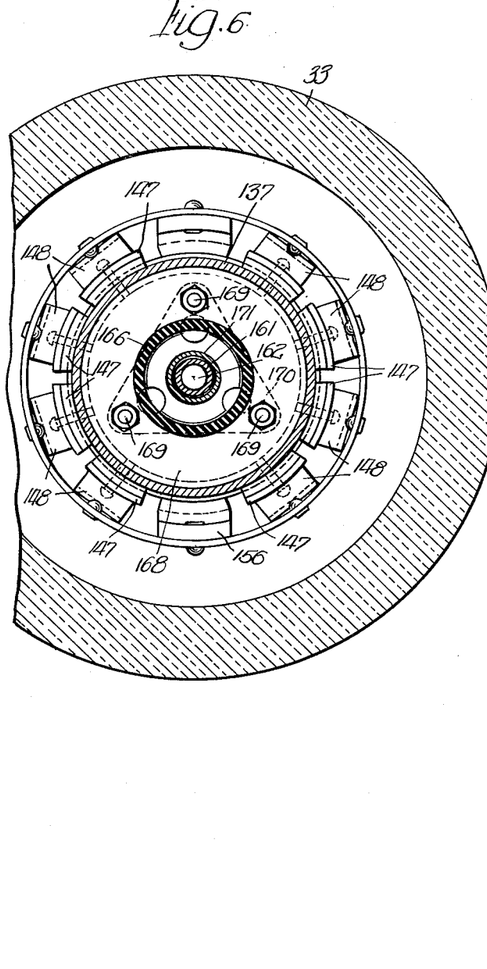
Figure 7:
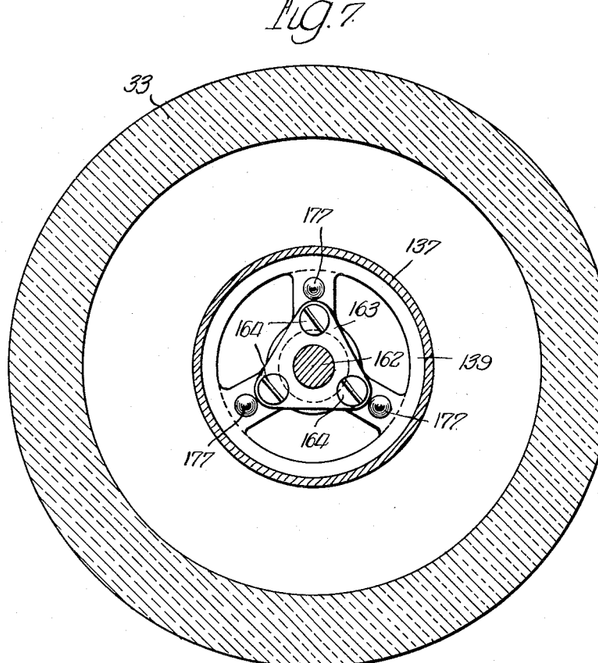
Figure 8:
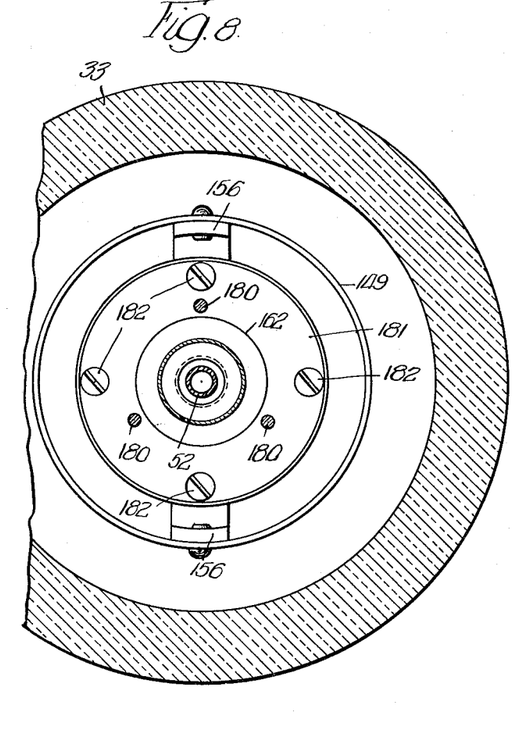
FIG. 8 is a vertical sectional view taken, generally, along the line 8—8 of FIG. 2C.

Referring first to FIGS. 2A—2B—3—4, it will be observed that the stationary contact 68 includes a plurality of bars, for example four, of good conducting material such as copper and indicated at 72. These bars 72 which not only function to conduct current but also as guides, are secured by screws 73 to the inner terminal 40 and by screws 74 to flat sides 75 of a portion of a support ring 76. The support ring 76 has an annular outwardly facing groove 77 for receiving bosses 78 of contact fingers 79 which are also shown in FIG. 5. Contact springs 80, individual to the contact fingers 79, serve to bias the latter inwardly and a retaining ring 81 surrounding the contact springs 80 serves to hold the latter in position. It will be observed that the stationary contact fingers 79 are mounted symmetrically about the longitudinal axis of the insulating housing 33 and at the distal ends of the bars 72 on the supporting ring 76. This symmetrical structure along with the cooperating symmetrical structures associated therewith functions to distribute uniformly the electrostatic stress between the first and second terminals 34 and 35 in either the open or closed position of the load current interrupter 32.

The first arcing contact 70, shown in FIGS. 2A—2B, includes a contact tip 84 of arc resisting material which is carried by a metallic contact sleeve 85 which, in turn, is secured to one end of a metallic drive tube 86. The drive tube 86 has an annular boss 87 intermediate its ends for a purpose that will be set forth presently. At the opposite end of the metallic drive tube 86 is a piston 88 having formed integrally therewith a sleeve 89 that is telescoped within the drive tube 86. The piston 88 has close fitting engagement with an inner sleeve 90 of a stop tube 91 which extends from and is secured to a key mounting block 92 that bears against the terminal plate 39. The key mounting block 92 has an annular groove 94 with openings 95 at the bottom through the stop tube 91 and the inner sleeve 90 into a gas space 96 into which the piston 88 moves. Surrounding the outer end of the openings 95 and along the bottom of the annular groove 94 is a pressure relief ring 97 which is formed of flat spring material having the ends overlapping. Surrounding the pressure relief ring 97 is a garter spring 98 with the arrangement being such, as described in U.S. Patent No. 2,108,993, issued February 2, 1938, that on the generation of predetermined pressure in the gas space 96 as a result of the movement of the piston 88 into it, the pressure relief ring 97 is expanded against the force of the garter spring 98 to exhaust the gas in space 96 through the openings 95. This construction is provided in order to prevent or limit the bouncing of the first arcing contact 70 when it is retracted as described hereinafter during the circuit opening operation.

During the circuit opening operation contact engagement is maintained between the first arcing contact 70 and the second arcing contact 71 as a result of conjoint movement thereof during a portion of the opening operation of the load current interrupter 32. It is desirable to move the first arcing contact 70 away from the second arcing contact 71 with a snap action to initiate the final opening of the circuit. For this purpose a spindle 99 is telescoped within the metallic contact sleeve 85 and the metallic drive tube 86. It has a head 100 at the inner end adjacent the contact tip 84 when it is in the circuit closed position and a foot 101 at the other end which constitutes a closure for the left end of the gas space 96 and is secured to the terminal plate 39. A coil compression spring 103 is interposed between the head 100 and foot 101 of the spindle 99 for the purpose of retracting the first arcing contact 70 when it is released for such movement. If desired, several layers of shock absorbing material 104 can be provided on the inner side of the foot 101 to receive the impact of the piston 88 at the end of the opening stroke of the first arcing contact 70.

FIGS. 2B–5 show how connection is made to the metallic contact sleeve 85 from the support ring 76. As here shown, roller contacts 105 in the form of elongated bars are mounted on the inside of the support ring 76 by screws 106. Additional screws 107 also provide for mounting the roller contacts 105 on the support ring 76 and their inner ends project inwardly to provide stops for limiting the movement of the conical contact rollers 108 four of which preferably are provided. It will be observed that the conical contact surfaces of the contact rollers 108 bear against the cylindrical surface 109 of the metallic contact sleeve 85 and also against the cylindrical surfaces 110 of the roller contacts 105. The contact rollers 108 are rotatably mounted on transversely extending bolts 111 and coil compression springs 112 serve to maintain good contact engagement between the contact rollers 108 and the respective cylindrical surfaces 109 and 110. Stop pins 113, extending radially inwardly from the roller contacts 105, serve to limit the endwise movement of the contact rollers 108 in the same fashion that the projecting ends of the screws 107 accomplish this function at the opposite ends of the roller contacts 105.

At a predetermined time in the opening sequence of operations of the load current interrupter 32, provision is made for triggering the first arcing contact 70 to permit it to be retracted under the influence of the coil compression spring 103. For this purpose, FIG. 2A, a collar 116 is slidably mounted on the metallic drive tube 86 at a position to the left of the annular boss 87. The collar 116 has a radially extending annular flange 117 which bears against the outer end of the stop tube 91 and thus limits the movement of the collar 116. Engageable with the annular flange 117 are shoulders 118 that are carried by pawls 119 which are pivoted at 120 on a carriage 121. The carriage 121 is slidable relative to the guide bars 72 and is directed therealong by transverse guides 122, FIG. 4, which are secured to the carriage 121 by screws 123. Here it will be observed that the transverse guides 122 have inclined guide surfaces 124 at their ends which overlie juxtaposed surfaces of the guide bars 72. The pawls 119 are normally maintained in the position shown in FIG. 2A with the shoulders 118 abutting the annular flange 117 through the agency of transverse pins 125 that are interconnected by coil tension springs 126. The pawls 119 are tripped to release the annular flange 117 by shoulders 127 that are provided on keys 128 which are pivoted at 129 on the key mounting block 92. The distal ends 130 of the keys 128 are guided in radial slots 131 in the juxtaposed ends of the roller contacts 105.

In order to accommodate erosion of the contact tip 84 and a juxtaposed contact tip on the second arcing contact 71 a coil compression spring 132 is interposed between the annular boss 87 and the annular flange 117. This arrangement provides some degree of lost motion between the first arcing contact 70 and the pawls 119.

With a view to moving the carriage 121 and parts associated for movement therewith pull rods 135 of insulating material are secured to the outstanding portions of the carriage 121 and also to outriggers 136 that are secured to and extend radially from a cylindrical movable contact 137 which forms a part of the movable contact 69. It will be noted that the cylindrical movable contact 137 has a contact ring 138 attached thereto at one end for contact engagement with the contact fingers 79 which form a part of the stationary contact 68. At its other end the cylindrical movable contact 137 has a head 139 brazed or otherwise secured thereto and it is provided with a central sleeve portion 140 that is telescoped over the coupling stud 64. An insulating sleeve 141 is interposed between the sleeve portion 140 and the coupling stud 64 in order to prevent flow of current to the coupling stud 64 and to the operating member 52 and the bellows 62 associated therewith. A threaded stud 142 extends endwise from the coupling stud 64 and over it is positioned an insulating washer 143 against which a nut 144 on the threaded stud 142 bears to complete the insulation between the head 39 and the coupling stud 64 while providing for the transmission of operating force therebetween.

As shown in FIGS. 2B—2C connection to the cylindrical movable contact 137 from the second circuit terminal 35, or more particularly from the terminal plate 48, is provided by contact fingers 147 which are urged into engagement with the outer surface of the cylindrical movable contact 137 by contact springs 148 that are held in place by a retaining ring 149. It will be understood that the cylindrical movable contact 137 moves from the circuit closed position shown in FIG. 2B of the drawings to an open position within the contact fingers 147 while they maintain contact engagement with the outer surface of the cylindrical movable contact 137. At the opposite ends the contact fingers 147 are provided with bosses 150 that interfit with an annular groove 151 in a contact support ring 152 that is secured, as by brazing, to the distal end of a conducting tube 153 the opposite end of which is secured, as by brazing, to the terminal plate 48. In order to insure retention of the contact fingers 147 on the contact support ring 152, headed pins 154 extend into the contact support ring 152 through clearance openings 155 in the adjacent ends of the contact fingers 147. The retaining ring 149 is held in position by brackets 156 which are secured by screws 157 to the outer surface of the contact support ring 152.

Referring now particularly to FIG. 2B of the drawings it will be observed that the second arcing contact 71 includes an annular contact tip 160 that engages the contact tip 84 of the first arcing contact 70 in the circuit closed position. The annular contact tip 160 is carried at one end of an arcing contact tube 161 which is telescoped over and secured, as by brazing, to a stud 162 which has a base 163 that is secured by screws 164 to the head 139. Openings 165 are provided in the arcing contact tube 161. The construction is such that the second arcing contact 71 is affixed to the movable contact 69 and moves conjointly therewith.

In order to direct a flow of arc extinguishing gas into the arc space that is formed on separation of the contact tip 84 from the contact tip 160, a nozzle 166 of insulating material, such as Teflon, is employed. The nozzle 166 has a throat portion 167 that is arranged, as will appear hereinafter, to surround the contact tips 84 and 160 during the circuit opening operation. The nozzle 166 is mounted on and moves with a disc 168 that is slidable in the cylindrical movable contact 137. The disc 168 is carried by mounting studs 169 on a flange 170 which has an integral central sleeve 171 which is slidable on the arcing contact tube 161. Relative movement between the sleeve 171 and the arcing contact tube 161 is limited by engagement of the left end of the sleeve 171 with the right end of the annular contact tip 160. The nozzle 166 is held in position shown in FIG. 2B by an annular stop plate 172 that is secured by screws 173 to the roller contacts 105. A coil compression spring 174 serves to urge the disc 168 against the annular stop plate 172 and to cause the nozzle 166 to move to the position above referred to where it completely encloses the contact tips 84 and 160.

It will be recalled that the insulating housing 33 is filled with an arc extinguishing gas such as sulfurhexafluoride. This gas is present within the cylindrical movable contact 137. In order to cause the gas to flow through the nozzle 166 a piston 175 is slidably mounted within the cylindrical movable contact 137 adjacent the head 139 and the coil compression spring 174 reacts between it and the disc 168.

Provision is made for moving the piston 175 relative to the cylindrical movable contact 137 as the latter is moved toward the open circuit position. For this purpose recesses 176 are provided on the underside of the piston 175 for receiving head fittings 177 that are carried at the ends of push tubes 178 which extend thorugh openings 179 in the head 139. The other ends of the push tubes 178 are telescoped over push rods 180 which are carried by a ring 181 that is secured by screws 182 to the contact support ring 152. During the initial portion of the opening stroke of the movable contact 69, the push tubes 178 move relative to the push rods 180 so that the piston 175 remains stationary with respect to the cylindrical movable contact 137. When the movable contact 137 has been withdrawn to such position that the distal ends of the push rods 180 engage the head fittings 177, the conjoint movement of the latter with the movable contact 137 ceases. Now on continued movement of the movable contact 137, the piston 175 remains stationary and compresses the arc extinguishing gas in the space 183 between it and the disc 168. As a result the gas flows through the nozzle 166 into the space in which the arc is drawn between the contact tips 84 and 160 for assisting in extinguishing the arc.

Figure 11:
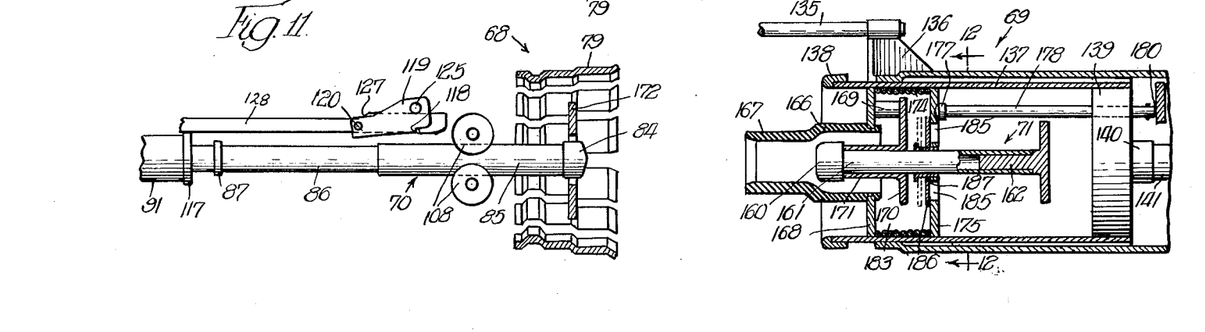
FIG. 11 is a view, similar to FIGS. 9 and 10, showing the main and arcing contacts in the fully opened positions thereof.
Figure 12:
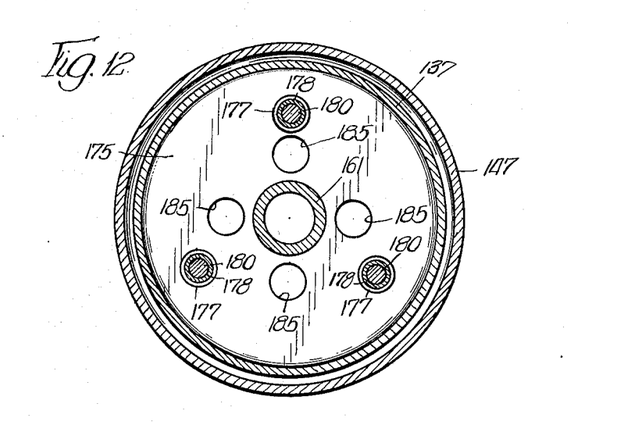
FIG. 12 is a vertical sectional view taken generally along the line 12—12 of FIG. 11 and showing the openings in the piston that are closed by the check valve.

During the initial portion of the closing movement of the movable contact 137, a vacuum may be created in the space 183. This can be obviated, as shown in FIG. 11, by providing openings 185 in the piston 175 and then overlying these openings with a check valve disc 186 that is slidably mounted on a spool shaped bushing 187 which extends through the opening in the piston 175 through which the arcing contact tube 161 extends.

In describing the circuit opening operation of the switch means 10, it will be assumed that it is in the closed position as shown in FIG. 1. In order to effect the opening operation the second insulator 13 is rotated by the operating linkage 17 to rotate the shaft 18 which effects rotation of the switch blade 24 about its longitudinal axis to relieve the high pressure contact engagement between it and the line contact member 28. While this is taking place a latch is released in the mechanism housing 19 as described in application Serial No. 704,397 to effect the movement of the main rod arm 55, FIG. 2D, to move the operating member 52 quickly from the closed position to the open position.

Figure 9:
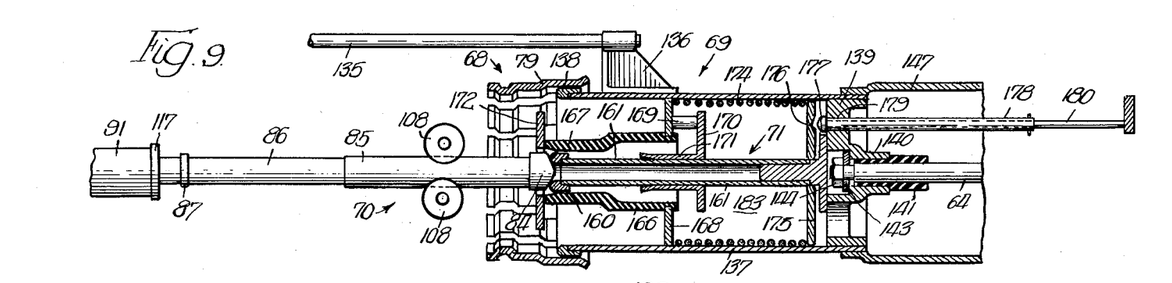
FIG. 9 is a view, somewhat diagrammatic in character, showing the relative positions of the main and arcing contacts in the closed positions thereof.

FIG. 9 of the drawings shows the closed positions of the stationary and movable contacts 68 and 69 and of the first and second arcing contacts 70 and 71. As pointed out hereinbefore, in the closed position the contact ring 138 on the cylindrical movable contact 137 is in contact engagement with the contact fingers 79 so as to provide the main current carrying path between the first and second circuit terminals 34 and 35. In addition, a shunt circuit is provided through the arcing tips 84 and 160 of the first and second arcing contacts 70 and 71.

Figure 10:
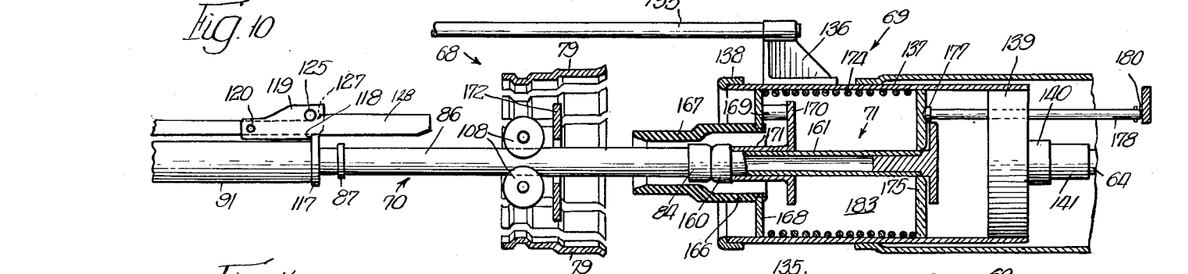
FIG. 10 is a view, similar to FIG. 9, but showing the movable contact in a partly open position while the arcing contacts remain closed.

FIG. 10 shows an intermediate stage in the opening of the load current interrupter 32. Here the movable contact 137 has been shifted to a position in spaced relation to the contact fingers 79 while the first and second arcing contacts 70 and 71 remain in contact engagement at their contact tips 84 and 160. The nozzle 166 has been released from engagement with the stop plate 172 and the coil compression spring 174 moves it to the position here shown where the throat portion 167 is well past the contact tip 84. At this time the piston 175 remains stationary with respect to the movable contact 137 since the push rods 180 are here shown in the position where they engage the head fittings 177.

The continued movement of the movable contact 137 toward the open position continues to the full open position shown in FIG. 11. During the time that the movable contact 137 shifts from the position shown in FIG. 10 to the position shown in FIG. 11, the transverse pins 125 have been tripped by engaging the trip shoulders 127 on the keys 128. The coil compression spring 103 is released and it moves the first arcing contact 70 to the position shown in FIG. 11 of the drawings. While this is taking place the arc is drawn between the contact tips 84 and 160 and arc extinguishing gas is being forced through the nozzle 166 since the piston 175 is moved to the position shown in FIG. 11 and the arc is extinguished.

Continued rotation of the insulator 13 in the opening direction swings the switch blade 24 out of contact engagement with the line contact member 28 after the circuit has been interrupted by the load current interrupter 32 in the manner described. Continued rotation of the insulator 13, as described in application Serial No. 704,397, swings the switch blade 24 to a position at right angles to its closed position, recocks the spring mechanism in the mechanism housing and operates the main rod arm 55, FIG. 2D, back to the position shown here. The positions of the stationary and movable contacts 68 and 69 and of the first and second arcing contacts 70 and 71 then are restored to those shown in FIGS. 2A—2B—2C—2D—9.

What is claimed as new is:

1. In a circuit interrupter, in combination, first and second circuit terminals in insulated spaced relation, a stationary contact connected to said first terminal and extending toward said second terminal, a movable contact connected to said second terminal and engaging said stationary contact in closed position, operating means connected to said movable contact for moving it along an axis endwise of said stationary contact between open and closed position, a first arcing contact mounted on said stationary contact for movement along said axis, biasing means for said first arcing contact urging it toward said first terminal, a second arcing contact mounted on and movable with said movable contact and engaging said first arcing contact in closed position, carriage means connected to said operating means and movable with said movable contact, disengageable connecting means between said carriage means and said first arcing contact for maintaining contact engagement between said first and second arcing contacts during the initial movement toward open position of said operating means and said movable contact, and trip means cooperating with said connecting means after said movable contact has disengaged said stationary contact to disengage said connecting means from said first arcing contact whereupon said first arcing contact is moved by said biasing means away from said second arcing contact to interrupt the circuit between said first and second terminals.

2. In a circuit interrupter, in combination, first and second circuit terminals in insulated spaced relation, a stationary contact connected to said first terminal and extending toward said second terminal, a movable contact connected to said second terminal and engaging said stationary contact in closed position, operating means connected to said movable contact for moving it along an axis endwise of said stationary contact between open and closed positions, a first arcing contact mounted on said stationary contact for movement along said axis, a first biasing means for said first arcing contact urging it toward said first terminal, a second arcing contact mounted on and movable with said movable contact and engaging said first arcing contact in closed position, a second biasing means for said first arcing terminal capable of exerting thereon a greater force than said first biasing means and urging said first arcing terminal into contact engagement with said second arcing contact in closed position, carriage means connected to said operating means and movable with said movable contact, disengageable connecting means between said carriage means and said first arcing contact for maintaining contact engagement between said first and second arcing contacts during the initial movement toward open position of said operating means and said movable contact, and trip means cooperating with said connecting means after said movable contact has disengaged said stationary contact to disengage said connecting means from said first arcing contact whereupon said first arcing contact is moved by said biasing means away from said second arcing contact to interrupt the circuit between said first and second terminals.

3. In a circuit interrupter, in combination, first and second circuit terminals in insulated spaced relation, a stationary contact connected to said first terminal and extending toward said second terminal, a movable contact connected to said second terminal and engaging said stationary contact in closed position, operating means connected to said movable contact for moving it along an axis endwise of said stationary contact between open and closed positions, a first arcing contact mounted on said stationary contact for movement along said axis and having a tubular section, a spindle secured at one end to said first terminal and telescoped within said tubular section of said first arcing contact, a coil compression spring interposed between the distal end of said spindle and said tubular section and urging said first arcing contact toward said first terminal, a second arcing contact mounted on and movable with said movable contact and engaging said first arcing contact in closed position, carriage means connected to said operating means and movable with said movable contact, disengageable connecting means between said carriage means and said first arcing contact for maintaining contact engagement between said first and second arcing contacts during the initial movement toward open position of said operating means and said movable contact, and trip means cooperating with said connecting means after said movable contact has disengaged said stationary contact to disengage said connecting means from said first arcing contact whereupon said first arcing contact is moved by said coil compression spring away from said second arcing contact to interrupt the circuit between said first and seond terminals.

4. In a circuit interrupter, in combination, first and second circuit terminals in insulated spaced relation, a stationary contact connected to said first terminal and extending toward said second terminal, a movable contact connected to said second terminal and engaging said stationary contact in closed position, operating means connected to said movable contact for moving it along an axis endwise of said stationary contact between open and closed positions, a first arcing contact mounted on said stationary contact for movement along said axis, biasing means for said first arcing contact urging it toward said first terminal, said first arcing contact having a tubular section with a piston at the end opposite its arcing end, a sleeve member on said fiirst terminal slidably receiving said piston and providing a space in which gas is compressed on retraction of said first arcing contact by said biasing means to cushion the stopping thereof, a second arcing contact mounted on and movable with said movable contact and engaging said first arcing contact in closed position, carriage means connected to said operating means and movable with said movable contact, disengageable connecting means between said carriage means and said first arcing contact for maintaining contact engagement between said first and second arcing contacts during the initial movement toward open position of said operating means and said movable contact, and trip means cooperating with said connecting means after said movable contact has disengaged said stationary contact to disengage said connecting means from said first arcing contact whereupon said first arcing contact is moved by said biasing means away from said second arcing contact to interrupt the circuit between said first and second terminals.

5. The invention, as set forth in claim 4, wherein the sleeve member has pressure relief means for the space in which gas is compressed by the piston to vent the space on generation therein of predetermined pressure.

6. In a circuit interrupter, in combination, first and second circuit terminals in insulated spaced relation, a stationary contact connected to said first terminal and extending toward said second terminal, a movable contact connected to said second terminal and engaging said stationary contact in closed position, operating means connected to said movable contact for moving it along an axis endwise of said stationary contact between open and closed positions, a first arcing contact having a cylindrical section and mounted on said stationary contact for movement along said axis, roller contact means interposed between said cylindrical section of said first arcing contact and said stationary contact, biasing means for said first arcing contact urging it toward said first terminal, a second arcing contact mounted on and movable with said movable contact and engaging said first arcing contact in closed position, carriage means connected to said operating means and movable with said movable contact, disengageable connecting means between said carriage means and said first arcing contact for maintaining contact engagement between said first and second arcing contacts during the initial movement toward open position of said operating means and said movable contact, and trip means cooperating with said connecting means after said movable contact has disengaged said stationary contact to disengage said connecting means from said first arcing contact whereupon said first arcing contact is moved by said biasing means away from said second arcing contact to interrupt the circuit between said first and second terminals.

7. In a circuit interrupter, in combination, first and second circuit terminals in insulated spaced relation, a stationary contact connected to said first terminal and extending toward said second terminal, a movable contact connected to said second terminal and engaging said stationary contact in closed position, operating means connected to said movable contact for moving it along an axis endwise of said stationary contact between open and closed positions, a first arcing contact having a cylindrical section and mounted on said stationary contact for movement along said axis, a pair of contact bars on said stationary contact on opposite sides of and having cylindrical surfaces facing said cylindrical section of said first arcing contact, a pair of conical contact rollers interposed between each contact bar and the juxtaposed side of said cylindrical section of said first arcing contact, stop means on said stationary contact limiting movement of said contact rollers with respect to said first arcing contact, biasing means for said first arcing contact urging it toward said first terminal, a second arcing contact mounted on and movable with said movable contact and engaging said first arcing contact in closed position, carriage means connected to said operating means and movable with said movable contact, disengageable connecting means between said carriage means and said first arcing contact for maintaining contact engagement between said first and second arcing contacts during the initial movement toward open position of said operating means and said movable contact, and trip means cooperating with said connecting means after said movable contact has disengaged said stationary contact to disengage said connecting means from said first arcing contact whereupon said first arcing contact is moved by said biasing means away from said arcing contact to interrupt the circuit between said first and second terminals.

8. In a circuit interrupter, in combination, first and second circuit terminals in insulated spaced relation, a stationary contact connected to said first terminal and extending toward said second terminal, a movable contact connected to said second terminal and engaging said stationary contact in closed position, operating means connected to said movable contact for moving it along an axis endwise of said stationary contact between open and closed positions, a first arcing contact mounted on said stationary contact for movement along said axis, biasing means for said first arcing contact urging it toward said first terminal, a second arcing contact mounted on and movable with said movable contact and engaging said first arcing contact in closed position, carriage means guided for movement along said axis between said first terminal and said stationary contact, pull rod means mechanically interconnecting said movable contact and said carriage means, disengageable connecting means between said carriage means and said first arcing contact for maintaining contact engagement between said first and second arcing contacts during the initial movement toward open position of said operating means and said movable contact, and trip means cooperating with said connecting means after said movable contact has disengaged said stationary contact to disengage said connecting means from said first arcing contact whereupon said first arcing contact is moved by said biasing means away from said second arcing contact to interrupt the circuit between said first and second terminals.

9. In a circuit interrupter, in combination, first and second circuit terminals in insulated spaced relation, a plurality of conducting guide bars extending symmetrically about an axis from said first terminal toward said second terminal, a plurality of contact fingers symmetrically mounted about said axis at the distal ends of said guide bars, a tubular movable contact connected to said second terminal and having telescoping engagement with said contact fingers, operating means connected to said movable contact for moving it along said axis endwise of said contact fingers between open and closed positions, a first arcing contact mounted on said guide bars for movement along said axis, biasing means reacting between said first terminal and said first arcing contact and urging the latter toward the former, a second arcing contact mounted centrally on and movable with said movable contact and engaging said first arcing contact in closed position, a carriage guided on said guide bars for movement along said axis between said first terminal and said contact fingers, insulated pull rod means mechanically interconnecting said movable contact and said carriage, disengageable connecting means between said carriage and said first arcing contact for maintaining contact engagement between said first and second arcing contacts against the action of said biasing means during the initial movement toward open position of said operating means and said movable contact, and trip means cooperating with said connecting means after said movable contact has disengaged said contact fingers to disengage said connecting means from said first arcing contact whereupon said first arcing contact is moved by said biasing means away from said second arcing contact to interrupt the circuit between said first and second terminals.

10. In a circuit interrupter, in combination, first and second circuit terminals in insulated spaced relation, a plurality of conducting guide bars extending symmetrically about an axis from said first terminal toward said second terminal, a plurality of contact fingers symmetrically mounted about said axis at the distal ends of said guide bars, a tubular movable contact connected to said second terminal and having telescoping engagement with said contact fingers, operating means connected to said movable contact for moving it along said axis endwise of said contact fingers between open and closed positions, a first arcing contact mounted on said guide bars for movement along said axis, biasing means reacting between said first terminal and said first arcing contact and urging the latter toward the former, a second arcing contact mounted centrally on and movable with said movable contact and engaging said first arcing contact in closed position, a carriage guided on said guide bars for movement along said axis between said first terminal and said contact fingers, insulated pull rod means mechanically interconnecting said movable contact and said carriage, pawl means on said carriage operatively connected to said first arcing contact and maintaining it in contact engagement with said second arcing contact against the action of said biasing means during the initial movement toward open position of said operating means and said movable contact, and key means extending from said first terminal along said axis toward said second terminal and cooperating with said pawl means after said movable contact has disengaged said contact fingers to move said pawl means out of its connection to said first arcing contact whereupon said first arcing contact is moved by said biasing means away from said second arcing contact to interrupt the circuit between said first and second terminals.

11. In a circut interrupter, in combination, first and second circuit terminals in insulated spaced relation, a plurality of conducting guide bars extending symmetrically about an axis from said first terminal toward said second terminal, a plurality of first contact fingers symmetrically mounted about said axis on the distal ends of said guide bars, immovable endwise and biased radially inwardly, a tubular movable contact having telescoping engagement at one end with said first contact fingers, a conducting member extending from said second terminal toward said first terminal; a plurality of second contact fingers symmetrically mounted about said axis on the distal end of said conducting member, immovable endwise, and biased radially inwardly into contact engagement with the other end of said tubular movable contact when it is in closed position; operating means connected to said movable contact for moving it along said axis endwise of said first and second contact fingers between open and closed positions while maintaining contact with said second contact fingers, a first arcing contact mounted on said guide bars for movement along said axis, biasing means reacting between said first terminal and said first arcing contact and urging the latter toward the former, a second arcing contact mounted centrally on and movable wtih said movable contact and engaging said first arcing contact in closed position, a carriage guided on said guide bars for movement along said axis between said first terminal and said contact fingers, insulated pull rod means mechanically interconnecting said movable contact and said carriage, disengageable connecting means between said carriage and said first arcing contact for maintaining it in contact engagement with said second arcing contact against the action of said biasing means during the initial movement toward open position of said operating means and said movable contact, and trip means cooperating with said connecting means after said movable contact has disengaged said first contact fingers to disengage said connecting means from said first arcing contact whereupon said first arcing contact is moved by said biasing means away from said second arcing contact to interrupt the circuit between said first and second terminals.

12. The invention, as set forth in claim 11, wherein insulating means is interposed between the operating means and said movable contact whereby the entire current flow takes place through the second contact fingers.

13. In a circuit interrupter, in combination, a fluid tight insulating housing, first and second circuit terminals at opposite ends of said housing, a filling of arc extinguishing gas in said housing, a stationary contact connected to said first terminal and extending toward said second terminal, a movable contact connected to said second terminal and engaging said stationary contacts in closed position, operating means connected to said movable contact for moving it along an axis endwise of said stationary contact between open and closed positions, a first arcing contact mounted on said stationary contact for movement along said axis, biasing means for said first arcing contact urging it toward said first terminal, a second arcing contact mounted on and movable with said movable contact and engaging said first arcing contact in closed position, carriage means connected to said operating means and movable with said movable contact, disengageable connecting means between said carriage means and said first arcing contact for maintaining contact engagement between said first and second arcing contacts during the initial movement toward open position of said operating means and said movable contact, trip means cooperating with said connecting means after said movable contact has disengaged said stationary contact to disengage said connecting means from said first arcing contact whereupon said first arcing contact is moved by said biasing means away from said arcing contact to interrupt the circuit between said first and second terminals, a nozzle mounted on and movable with said movable contact for directing a flow of said arc extinguishing gas to the space between said arcing contacts, and means operated by said operating means to cause said arc extinguishing gas to flow under pressure through said nozzle into said space.

14. In a circuit interrupter, in combination, a fluid tight insulating housing, first and second terminals at opposite ends of said housing, a filling of arc extinguishing gas in said housing, a stationary contact connected to said first terminal and extending toward said second terminal, a tubular movable contact closed at one end and opening toward said first terminal, said movable contact being connected to said second terminal and engaging said stationary contact in closed position, operating means connected to said movable contact for moving it along an axis endwise of said stationary contact between open and closed positions, a first arcing contact mounted on said stationary contact for movement along said axis, biasing means for said first arcing contact urging it toward said first terminal, a second arcing contact mounted on and movable with said movable contact and engaging said first arcing contact in closed position and projecting out of the open end of said movable contact, carriage means connected to said operating means and movable with said movable contact, disengageable connecting means between said carriage means and said first arcing contact for maintaining contact engagement between said first and second arcing contacts during the initial movement toward open position of said operating means and said movable contact, trip means cooperating with said connecting means after said movable contact has disengaged said stationary contact to disengage said connecting means from said first arcing contact whereupon said first arcing contact is moved by said biasing means away from said second arcing contact to interrupt the circuit between said first and second terminals, a nozzle slidably mounted within said tubular movable contact on said second arcing contact for directing a flow of said arc extinguishing gas to the space between said arcing contacts, means biasing said nozzle outwardly of said tubular movable contact to surround a substantial part of said space and the arc drawn therein on opening movement of said movable contact, and means operated by said operating means to cause said arc extinguishing gas to flow under pressure through said nozzle into said space.

15. In a circuit interrupter, in combination, a fluid tight insulating housing, first and second circuit terminals at opposite ends of said housing, a filling of arc extinguishing gas in said housing, a stationary contact connected to said first terminal and extending toward said second terminal, a tubular movable contact closed at one end and opening toward said first terminal, said movable contact being connected to said second terminal and engaging said stationary contact in closed position, operating means connected to said movable contact for moving it along an axis endwise of said stationary contact between open and closed positions, a first arcing contact mounted on said stationary contact for movement along said axis, biasing means for said first arcing contact urging it toward said first terminal, a second arcing contact mounted on and movable with said movable contact and engaging said first arcing contact in closed position and projecting out of the open end of said movable contact, carriage means connected to said operating means and movable with said movable contact, disengageable connecting means between said carriage means and said first arcing contact for maintaining contact engagement between said first and second arcing contacts during the initial movement toward open position of said operating means and said movable contact, trip means cooperating with said connecting means after said movable contact has disengaged said stationary contact to disengage said connecting means from said first arcing contact whereupon said first arcing contact is moved by said biasing means away from said second arcing contact to interrupt the circuit between said first and second terminals, a sleeve slidable on said arcing contact carrying a radially extending flange, a disc extending substantially entirely across the interior of said tubular contact and mounted on said flange in spaced relation thereto, a nozzle telescoped over said second arcing contact and carried by and opening through said disc for directing a flow of said arc extinguishing gas to the space between said arcing contacts, means biasing said disc and thereby said nozzle outwardly of said tubular movable contact to surround a substantial part of said space and the arc drawn therein on opening movement of said movable contact, and means operated by said operating means to cause said arc extinguishing gas to flow under pressure through said nozzle into said space.

16. The invention, as set forth in claim 15, wherein the means causing the arc extinguishing gas to flow under pressure through the nozzle is a piston within the tubular movable contact at its closed end and guided on the second arcing contact, spring means bias the disc and piston apart, and means extending from the second terminal cooperate with said piston to hold the same stationary while said movable contact continues to move toward open position.

17. The invention, as set forth in claim 16, wherein the means extending from the second terminal to hold the piston stationary include a plurality of push rods extending through the closed end of the tubular contact and having sliding telescoping engagement with rods extending from the second terminal.

18. The invention, as set forth in claim 16, wherein a check valve is mounted on the piston and opens to maintain communication between opposite sides thereof during movement thereof away from the disc carrying the nozzle during the initial movement of the movable contact to closed position.

No references cited.